United States Patent [19]

Cavenago

[11] Patent Number: 5,048,146
[45] Date of Patent: Sep. 17, 1991

[54] WIPER BLADE

[76] Inventor: Adrian Cavenago, R.R. #2, Harrow, Ontario, Canada, N0R 1G0

[21] Appl. No.: 617,516

[22] Filed: Nov. 28, 1990

Related U.S. Application Data

[63] Continuation-in-part of Ser. No. 439,820, Nov. 21, 1989.

[30] Foreign Application Priority Data

Jan. 23, 1990 [TW] Taiwan ............................... 79100524

[51] Int. Cl.⁵ ................................................ B60S 1/38
[52] U.S. Cl. ............................... 15/250.36; 15/250.40
[58] Field of Search ........... 15/250.36, 250.40, 250.41, 15/250.42, 250.32

[56] References Cited

U.S. PATENT DOCUMENTS 3,040,359  6/1962  Deibel ............................... 15/250.36
4,014,061  3/1977  Jurowski et al. .................. 15/250.32
4,654,246  3/1987  Provost et al. ........................ 428/88

FOREIGN PATENT DOCUMENTS 1316781  5/1973  United Kingdom ............. 15/250.41

OTHER PUBLICATIONS

PCT #WO80/01155, 6/1980, Frimley.

Primary Examiner—Harvey C. Hornsby
Assistant Examiner—Patrick F. Brinson
Attorney, Agent, or Firm—Harness, Dickey & Pierce

[57] ABSTRACT

A windshield wiper blade that wipes in both directions in the same manner as a conventional wiper blade, but further comprises a scrubbing surface on one or both sides thereof which functions automatically to apply a scrubbing action to any foreign material deposited on the windshield to remove same.

58 Claims, 2 Drawing Sheets

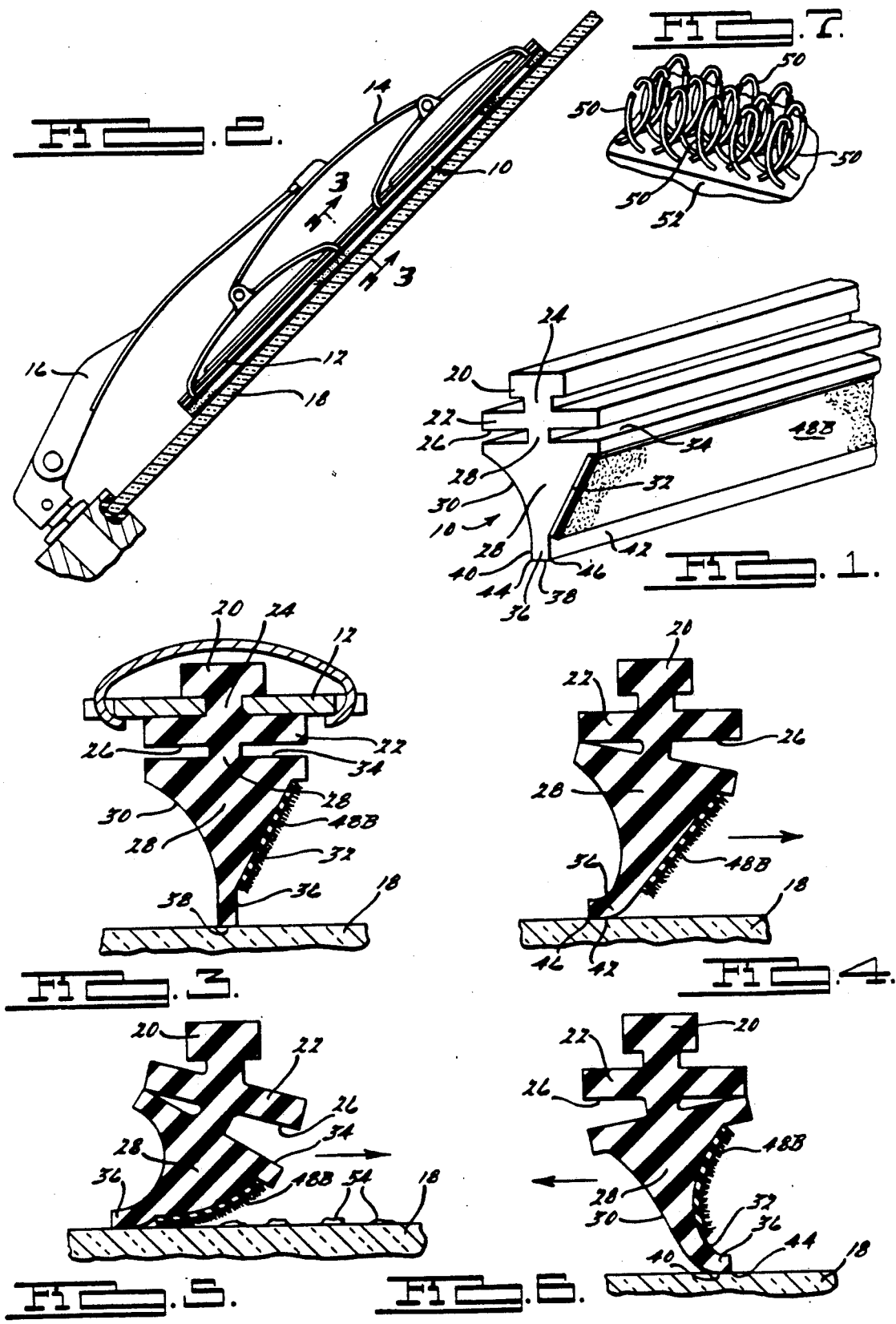

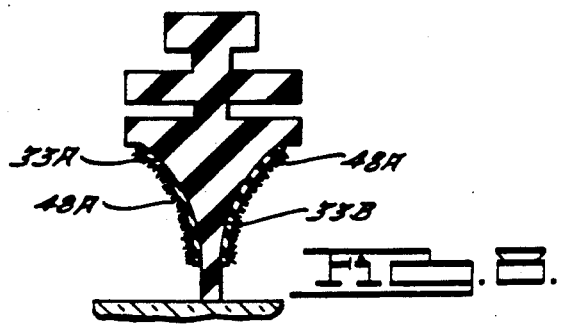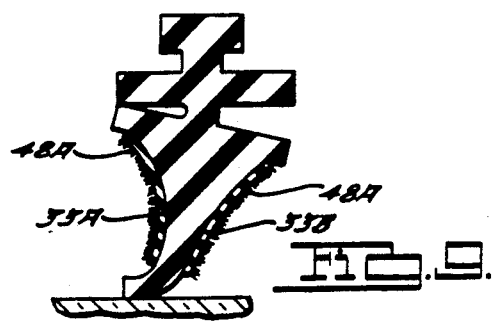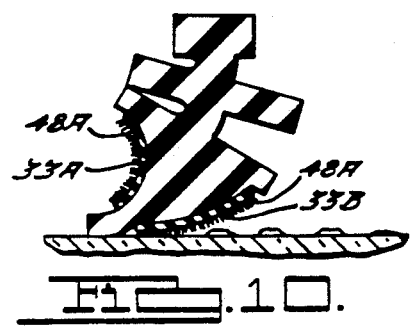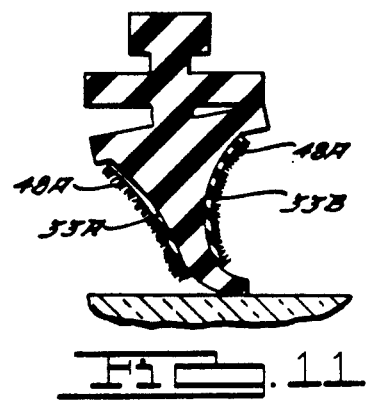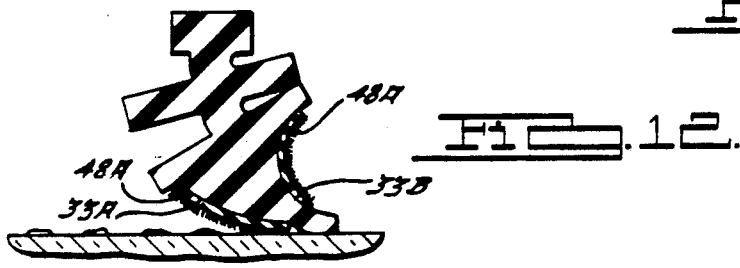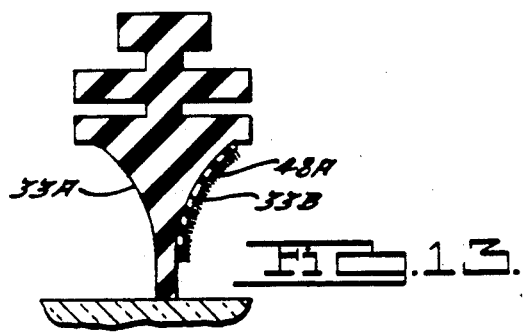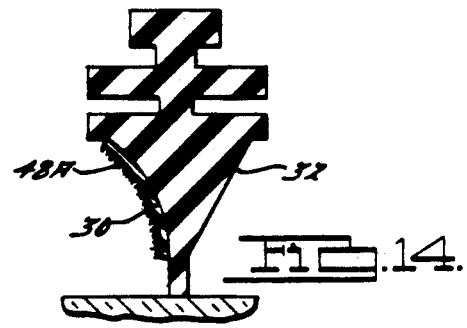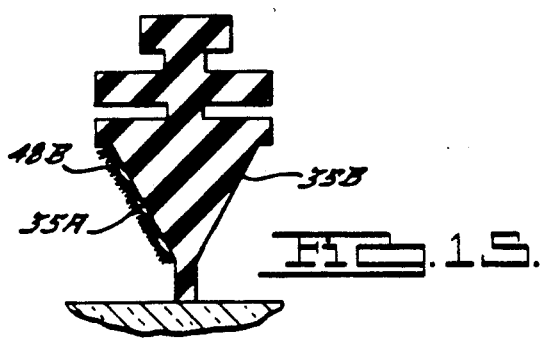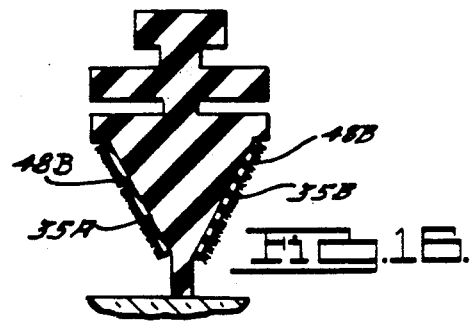

WIPER BLADE

This application is a continuation-in-part of copending application Ser. No. 439,820 filed Nov. 21, 1989 entitled "Wiper Blade".

BACKGROUND AND SUMMARY OF THE INVENTION

This invention relates to wiper blades, and more particularly to an improved wiper blade specifically adapted for use on vehicle windshields and the like, which is capable of both wiping water from the windshield and also of scrubbing off foreign matter deposited on the windshield.

Known blade devices for performing this additional scrubbing function, assuming they were even functional, have suffered from a number of disadvantages. For example, they tend to be very bulky, often utilizing two separate parallel blades, thus impairing forward vision, they usually require excessive power to operate, they often do not park in the normal manner under standard vehicle cowl panels, they sometimes require special blade holders, they are expensive to manufacture and they can cause excessive windshield wear. In addition some such devices require manual actuation to go into scrubbing mode, and many of them either do not scrub well or scrub for the entire length thereof, rather than merely the area which requires scrubbing.

It is therefore a primary object of this invention to provide an improved wiper blade which is extremely simple in construction and inexpensive to manufacture and yet which overcomes all of the aforementioned problems associated with prior designs.

The wiper blade of the present invention has two general configurations that both provide the usual squeegee or wiping action when moving in either direction, in the exact same manner as a conventional wiper blade; but when moving in one direction one configuration provides, in addition to the normal wiping action, a scrubbing action to remove foreign matter (such as sap, bugs, etc.) deposited on the windshield. In the other configuration, the wiper blade of the present invention provides, in addition to the normal wiping action, a scrubbing action when moving in either direction. This scrubbing action takes place automatically when required and only in that area along the blade where scrubbing is required. The scrubbing portions of the blade are sufficiently open that they will not collect water and thereby hinder subsequent wiping operations. The wiper blade of the present invention is essentially a single elongated blade and therefore fits in a standard wiper blade frame, and will park under any cowling that a conventional blade will. It does not require excessive power to operate and does not cause excessive wear of the windshield. Furthermore, it does not impair forward vision any more than a conventional wiper blade does.

Because the wiper blade of the present invention keeps a vehicle windshield cleaner than known wiper blades, it offers significant safety advantages.

Other advantages and features will become apparent from the following specification taken in connection with the accompanying drawings.

BRIEF DESCRIPTION OF THE DRAWINGS

FIG. 1 is a perspective view of a portion of one configuration of the wiper blade of the present invention;

FIG. 2 is a side elevational view of the wiper blade of FIG. 1 in a standard blade frame and in operative engagement with an ordinary windshield (shown in vertical cross-sectional);

FIG. 3 is a transverse cross-sectional view taken along line 3—3 in FIG. 1 with the wiper blade at rest on the windshield;

FIG. 4 is a view similar to FIG. 3 showing this configuration of the wiper blade of the present invention moving to the right in a squeegee or wiping mode;

FIG. 5 is a view similar to FIG. 4 showing this configuration of the wiper blade in its scrubbing mode;

FIG. 6 is a view similar to FIG. 4 showing this configuration of the wiper blade moving in the opposite direction in its squeegee or wiping mode;

FIG. 7 is a fragmentary perspective view, highly enlarged, of a portion of the scrubbing means of the present invention;

FIG. 8 is a transverse cross-sectional view similar to FIG. 3 of a second configuration of the wiper blade of the present invention, wherein the wiper blade has two concave faces and two scrubbing surfaces and is shown at rest on the windshield;

FIG. 9 is a view similar to FIG. 8 showing the second configuration of the wiper blade of the present invention moving to the right in a squeegee or wiping mode;

FIG. 10 is a view similar to FIG. 9 showing the second configuration of the wiper blade in its scrubbing mode;

FIG. 11 is a view similar to FIG. 9 showing the second configuration of the wiper blade moving in the opposite direction in its squeegee or wiping mode;

FIG. 12 is a view similar to FIG. 11 showing the second configuration of the wiper blade in its scrubbing mode as it traverses in the opposite direction;

FIG. 13 is a transverse cross-sectional view of another configuration of a wiper blade of the present invention with two concave faces and one scrubbing surface;

FIG. 14 is a transverse cross-sectional view of yet another configuration of a wiper blade of the present invention with one concave face and one flat face with one scrubbing surface on the concave face;

FIG. 15 is a transverse cross-sectional view of another configuration of a wiper blade of the present invention with two flat faces and one scrubbing surface; and FIG. 16 is a transverse cross-sectional view of yet another configuration of a wiper blade of the present invention with two flat faces and two scrubbing surfaces.

DESCRIPTION OF THE PREFERRED EMBODIMENT

The overall configuration of the wiper blade of the present invention, indicated generally at 10, is best shown in FIG. 1, and in FIG. 2 is shown in its normal environment wherein it is affixed in the normal manner to a standard wiper blade frame 12 connected in the usual way by a conventional linkage 14 to a standard powered wiper arm 16, the blade being shown in an at rest condition of engagement with a windshield 18. Blade 10 is formed of an elastomeric material which is the same material and durometer as currently used for conventional windshield wiper blades, and comprises when in an unstressed state, an elongated mounting portion 20 of standard design adapted to be mounted to blade frame 12 in the usual manner, an elongated base portion 22 of generally rectangular cross-section and being integrally connected to mounting portion 20 by a relatively narrow elongated connecting portion 24 and having a relatively flat surface 26 on the opposite side thereof from mounting portion 20, an elongated relatively narrow transversely flexible connecting portion 28 integrally connected to base portion 22 and extending generally along the middle of flat surface 26, an elongated body portion 28 of generally triangularly shaped cross-section having one apex thereof adapted to be generally pointed towards the windshield. This apex can be disposed between any combination of flat and convex surfaces. In one embodiment the apex is disposed between a generally concave face 30 of standard contour and a generally flat face 32 (FIGS. 3 and 14). In an alternate embodiment, the apex is disposed between two generally concave faces 33A and 33B (FIGS. 8 and 13). FIGS. 15 and 16 show an apex disposed between two flat faces 35A and 35B.

All embodiments utilize a third elongated face 34 of body portion 28 that is integrally connected to connecting portion 28 and adapted to be disposed generally parallel to flat surface 26 on base portion 22, and an elongated generally rectangular squeegee portion 36 integrally connected to body portion 28 along said apex, squeegee portion 36 having an elongated free end surface 38 generally parallel to face 34 and generally parallel wiping surfaces 40 and 42 extending therefrom toward said body portion 28, the intersection of end surface 38 and wiping surfaces 40 and 42 defining first and second wiping edges 44 and 46, wiping edge 44 and surface 40 being adapted to wipe the windshield when said wiper is moved in one direction thereacross (FIG. 6) and wiping edge 46 and surface 42 being adapted to wipe the windshield when wiper is moved in the opposite direction (FIG. 4).

In one blade configuration, a unique scrubbing surface is provided on one face (FIGS. 3, 13 and 15), and in the other blade configuration, a scrubbing surface is provided on both faces (FIGS. 8, 14 and 16). One type of scrubbing surface 48A is designed to be affixed to a concave surface and another type of scrubbing surface 48B is designed to be affixed to a flat surface. These scrubbing surfaces 48A and 48B each comprise a large number of short relatively stiff projections 50 affixed to a substrate 52. Scrubbing surfaces 48A and 48B normally would not engage the window, but in the first blade configuration it does rub on the window to scrub foreign matter therefrom when the wiper is moved across the windshield in the direction said scrubbing surface is facing and the squeegee portion encounters foreign matter 54 on the windshield (FIG. 5). In another blade configuration, where scrubbing surface 48A is on both faces 33A and 33B, each scrubbing surface 48A normally would not engage the window, but do individually engage the window to scrub foreign matter therefrom when the wiper is moved across the windshield in either direction and the squeegee portion encounters foreign matter 54 on the windshield (FIGS. 10 and 12). This is because the resultant increased friction between said squeegee portion and the foreign matter on the windshield causes the squeegee portion in the area of said foreign matter to fold over further than normally to automatically bring the scrubbing surface into action in the area of the foreign matter to remove same from the windshield, whether it be in one pass or after several passes. The blade scrubs only when and where necessary, thus decreasing wear.

For maximum cleaning effect, the scrubbing surface in one blade configuration is affixed to the side of the blade which moves forward first from an off condition, so scrubbing is available even on the first pass. The relatively thick section of elastomeric material between the scrubbing surface and the opposite edge of surface 34, due to the fact surface 32 is flat and not convex, is believed to enhance the scrubbing action of the blade by providing a butressing cross-section perpendicular to the center of the scrubbing surface to increase the amount of force which can be applied during the scrubbing action.

In other configurations, which are also believed to work as satisfactorily, scrubbing surfaces 48A and 48B are affixed to both faces. This enables a scrubbing surface 48A or 48B to engage as the blade 10 traverses across the windshield 18 in either direction as shown in FIGS. 9-12.

One material which has been found to be uniquely suitable to provide the scrubbing surface is the hook component of conventional, inexpensive and readily available, hook-and-loop tape fasteners, such as the well known types sold under the "Velcro" brand and shown in FIG. 7. Although it is believed that any of the available hook configurations would work (e.g., fabric hooks, molded arrowhead hooks, molded J-hooks etc.), applicant has had particularly good success with conventional "Velcro" brand fabric hooks, such as those shown in U.S. Pat. Nos. 2,717,437, 3,009,235, 3,130,111, 3,154,837 and 3,387,345 the disclosures of which are herein incorporated by reference. Other generally similar hook fasteners are shown in U.S. Pat. Nos. 3,076,244, 3,147,528 and 3,192,589.

As best shown in FIG. 7, applicant's fabric hooks are generally random in orientation and consist of stiff loops preferably formed of nylon which have been severed slightly below the bight portion thereof to form a stiff, wire-like projection and a J-shaped hook. This loop tape is readily available with a nylon backing and nylon loops, and also with a polyester backing with polyester loops. It is believed that both products will work satisfactorily, but the all nylon construction is believed to be preferred. The loop tape is either fabricated or cut to the width desired, and after being cut to length is permanently affixed to wiper blade surface 32 by any suitable adhesive which will adhere to the materials used and yet remain sufficiently flexible and pliant under all expected operating conditions to perform in the manner described above. One such adhesive is Weatherstrip Adhesive No. 80119 manufactured by 3M Corporation. The orientation of the loops on the loop tape on the wiper blade does not appear to be critical. The resultant scrubbing surface has been found to wear better than the rest of the wiper blade and does not cause excessive wear on or scratch the windshield. Furthermore, it does not retain water because of the open row-like nature of the tape fabric. In normal conditions of rain and/or snow no scrubbing takes place and the wiper blade functions exactly the same as a convention wiper blade. Engagement of the wiper body with the base thereof tends to limit the amount the blade can tilt in operation, in the conventional manner. It also increases the force which can be transmitted to the blade when in the scrubbing mode, thus enhancing the scrubbing action.

While it will be apparent that both configurations of the invention disclosed are well calculated to provide the advantages above stated, it will be appreciated that the invention is susceptible to modification, variation and change without departing from the proper scope or fair meaning of the subjoined claims.

What is claimed is:

1. An elastomeric windshield wiper blade comprising when in an unstressed state:
   (a) an elongated mounting portion of standard configuration adapted to be mounted to a conventional windshield wiper blade holding frame;
   (b) an elongated base portion of generally rectangular cross-section being integrally connected to said mounting portion and having a relatively flat surface on the opposite side thereof from said mounting portion;
   (c) an elongated relatively narrow transversely flexible connecting portion being integrally connected to said base portion and extending generally along the middle of said flat surface;
   (d) an elongated body portion of generally triangularly shaped cross-section having one apex thereof adapted to be generally pointed towards the windshield, said apex being disposed between first and second elongated faces of said body portion with a third elongated face of said body portion being integrally connected to said connecting portion and adapted to be disposed generally parallel to said flat surface on said base portion;
   (e) an elongated generally rectangular squeegee portion integrally connected to said body portion along said apex, said squeegee portion having an elongated free end surface generally parallel to said third face and generally parallel wiping surfaces extending therefrom toward said body portion, the intersection of said end surface end said wiping surfaces defining first and second wiping edges, said first wiping edge being adapted to wipe the windshield when said wiper blade is moved in one direction thereacross and said second wiping edge being adapted to wipe the windshield when said wiper is moved in the opposite direction,
   said first face being generally concave in cross-sectional configuration,
   said second face being generally flat in cross-sectional configuration; and
   (f) a scrubbing surface on said second face comprising a plurality of short relatively stiff projections which do not engage the windshield surface when said wiper blade is moved across said windshield in the direction said scrubbing surface is facing and said squeegee portion does not encounter foreign matter on the windshield but which do rub on the window to scrub foreign matter therefrom when said wiper blade is moved across the windshield in the direction said scrubbing surface is facing and said squeegee portion encounters foreign matter on the windshield, the resultant increased friction between said squeegee portion and the window causing said squeegee portion in the area of said foreign matter to fold over further than normally to bring said scrubbing surface into action in the area of said foreign matter to remove same from the windshield.

2. An elastomeric windshield wiper blade as claimed in claim 1 wherein said scrubbing surface is formed separately from said wiper thereafter affixed thereto.

3. An elastomeric windshield wiper blade as claimed in claim 1 wherein said scrubbing surface is sufficiently open that it will not retain liquid found on the windshield.

4. An elastomeric windshield wiper blade as claimed in claim 1 wherein along the length of said wiper blade one portion thereof can be scrubbing at the same time another spaced portion thereof can be wiping only.

5. An elastomeric windshield wiper blade as claimed in claim 1 wherein said scrubbing surface comprises "Velcro"-type hook fastener material.

6. An elastomeric windshield wiper blade as claimed in claim 5 wherein said hook fastener material is a woven material.

7. An elastomeric windshield wiper blade as claimed in claim 6 wherein said hook fastener material is formed of nylon.

8. An elastomeric windshield wiper blade as claimed in claim 6 wherein said hook fastener material comprises a large number of upstanding loops which have been severed slightly below the bight portion thereof.

9. An elastomeric windshield wiper blade as claimed in claim 1 wherein said wiper blade is adapted to be positioned on the wiper blade frame so that the first cycle of operation of the wiper actuating mechanism from an off condition is in the direction said scrubbing surface is facing 10. An elastomeric windshield wiper blade as claimed in claim 1 wherein the cross-sectional dimension of said body portion perpendicular to said second face is greater than the cross-sectional dimension of said body portion perpendicular to said first face.

11. An elastomeric windshield wiper blade as claimed in claim 1 wherein transverse tilting of said body portion in operation causes it to engage said base portion to restrict the movement thereof.

12. A wiper blade comprising when in an unstressed state:
   (a) a mounting portion adapted to be mounted to a wiper blade holding frame;
   (b) an elongated body portion having a squeegee portion adapted to engage the windshield, said squeegee portion being disposed between first and second elongated faces of said body portion, said body portion being connected to said mounting portion, said squeegee portion being adapted to wipe the windshield when said wiper blade is moved in either direction thereacross; and
   (c) a scrubbing surface on said second face which does not engage the windshield surface when said wiper blade is moved across said windshield in the direction said scrubbing surface is facing and said squeegee portion does not encounter foreign matter on the windshield but which does engage the window to scrub foreign matter therefrom when said wiper blade is moved across the windshield in the direction said scrubbing surface is facing and said squeegee portion encounters foreign matter on the windshield.

13. An elastomeric windshield wiper blade as claimed in claim 12 wherein said body portion is generally triangular in cross-section with said squeegee portion disposed at an apex thereof.

14. An elastomeric windshield wiper blade as claimed in claim 13 wherein said scrubbing portion is sufficiently open that it will not retain liquid found on the windshield.

15. An elastomeric windshield wiper blade as claimed in claim 13 wherein along the length of said wiper blade one portion thereof can be scrubbing at the same time another spaced portion thereof can be wiping only.

16. An elastomeric windshield wiper blade as claimed in claim 13 wherein said scrubbing portion comprises "Velcro"-type hook fastener material.

17. An elastomeric windshield wiper blade as claimed in claim 16 wherein said hook fastener material is a woven material.

18. An elastomeric windshield wiper blade as claimed in claim 17 wherein said hook fastener material comprises a large number of upstanding loops which are severed slightly below the bight portion thereof.

19. An elastomeric windshield wiper blade as claimed in claim 17 wherein said hook fastener material is formed of nylon.

20. An elastomeric windshield wiper blade as claimed in claim 13 wherein the cross-sectional dimension of said body portion perpendicular to said second face is greater than the cross-sectional dimension of said body portion perpendicular to said first face.

21. An elastomeric windshield wiper blade as claimed in claim 13 wherein said mounting portion, body portion and squeegee portion are integral with one another.

22. An elastomeric windshield wiper blade as claimed in claim 21 wherein said integral portions are formed of an elastomeric polymeric material.

23. An elastomeric windshield wiper blade as claimed in claim 13 wherein said first face is generally concave in cross-sectional configuration.

24. An elastomeric windshield wiper blade as claimed in claim 13 wherein said second face is generally flat in cross-sectional configuration.

25. An elastomeric windshield wiper blade as claimed in claim 12 wherein said scrubbing portion comprises a large number of relatively short, stiff, wire-like projections.

26. An elastomeric windshield wiper blade as claimed in claim 25 wherein said projections are formed of nylon.

27. An elastomeric windshield wiper blade as claimed in claim 26 wherein said projections are formed of a polyester material.

28. An elastomeric windshield wiper blade comprising when in an unstressed state:
(a) an elongated mounting portion;
(b) an elongated base portion of generally rectangular cross-section being integrally connected to said mounting portion;
(c) an elongated relatively narrow transversely flexible connecting portion being integrally connected to said base portion;
(d) an elongated body portion of generally triangularly shaped cross-section having one apex thereof adapted to be generally pointed towards the windshield, said apex being disposed between first and second elongated faces of said body portion with a third elongated face of said body portion being integrally connected to said connecting portion;
(e) an elongated generally rectangular squeegee portion integrally connected to said body portion along said apex, said squeegee portion having an elongated free end surface and generally parallel wiping surfaces extending therefrom toward said body portion, said wiping surfaces being adapted to respectively wipe the windshield when said wiper blade is moved in either direction there across; and
(f) a scrubbing surface on said second face comprising a plurality of short relatively stiff projections which do not engage the windshield surface when said wiper blade is moved across aid windshield in the direction said scrubbing surface is facing and said squeegee portion does not encounter foreign matter on the windshield but which do rub on the window to scrub foreign matter therefrom when said wiper blade is moved across the windshield in the direction said scrubbing surface is facing and said squeegee portion encounters foreign matter on the windshield, the resultant increased friction between said squeegee portion and the windshield causing said squeegee portion in the area of said foreign matter to fold over further than normally to bring said scrubbing surface into action in the area of said foreign matter to remove same from the windshield.

29. An elastomeric windshield wiper blade as claimed in claim 28 wherein said second face is generally flat in cross-sectional configuration.

30. An elastomeric windshield wiper blade as claimed in claim 28 wherein along the length of said wiper blade one portion thereof can be scrubbing at the same time another spaced portion thereof can be wiping only.

31. An elastomeric windshield wiper as claimed in claim 28 wherein said scrubbing portion comprises "Velcro"-type hook fastener.

32. An elastomeric windshield wiper as claimed in claim 31 wherein said material is formed of nylon.

33. An elastomeric windshield wiper as claimed in claim 31 wherein said material is formed of "a polyester material".

34. An elastomeric windshield wiper as claimed in claim 31 wherein said hook fastener material comprises a large number of upstanding loops which are severed slightly below the bight portion thereof.

35. An elastomeric windshield wiper blade as claimed in claim 28 wherein the cross-sectional dimension of said body portion perpendicular to said second face is greater than the cross-sectional dimension of said body portion perpendicular to said first face.

36. A wiper blade comprising when in an unstressed state:
(a) a mounting portion adapted to be mounted to a wiper blade holding frame;
(b) an elongated body portion having a squeegee portion adapted to engage the windshield, said squeegee portion being disposed between first and second elongated faces of said body portion, said body portion being connected to said mounting portion, said squeegee portion being adapted to wipe the windshield when said wiper blade is moved in either direction thereacross; and
(c) a scrubbing surface on each of said first and second faces, neither of which would engage the windshield when the wiper blade is moved across the windshield in either direction and said squeegee portion does not encounter foreign matter on the windshield but which wound engage the window individually to scrub foreign matter therefrom when said wiper blade is moved across the windshield in either direction and said squeegee portion encounters foreign matter on the windshield.

37. An elastomeric windshield wiper blade as claimed in claim 36 wherein said body portion is generally triangular in cross-section with said squeegee portion disposed at an apex thereof.

38. An elastomeric windshield wiper blade as claimed in claim 37 wherein said scrubbing portion is sufficiently open that it will not retain liquid found on the windshield.

39. An elastomeric windshield wiper blade as claimed in claim 37 wherein along the length of said wiper blade one portion thereof can be scrubbing at the same time another spaced portion thereof can be wiping only.

40. An elastomeric windshield wiper blade as claimed in claim 37 wherein said scrubbing portion comprises "Velcro"-type hook fastener material.

41. An elastomeric windshield wiper blade as claimed in claim 40 wherein said hook fastener material is a woven material.

42. An elastomeric windshield wiper blade as claimed in claim 41 wherein said hook fastener material comprises a large number of upstanding loops which are severed slightly below the bight portion thereof.

43. An elastomeric windshield wiper blade as claimed in claim 41 wherein said hook fastener material is formed of nylon.

44. An elastomeric windshield wiper blade as claimed in claim 37 wherein said mounting portion, body portion and squeegee portion are integral with one another.

45. An elastomeric windshield wiper blade as claimed in claim 44 wherein said integral portions are formed of an elastomeric polymeric material.

46. An elastomeric windshield wiper blade as claimed in claim 37 wherein said first and second faces are generally concave in cross-sectional configuration.

47. An elastomeric windshield wiper blade as claimed in claim 36 wherein said scrubbing portion comprises a large number of relatively short, stiff, wire-like projections.

48. An elastomeric windshield wiper blade as claimed in claim 47 wherein said projections are formed of nylon.

49. An elastomeric windshield wiper blade as claimed in claim 48 wherein said projections are formed of a polyester material.

50. An elastomeric windshield wiper blade comprising when in an unstressed state:
  (a) an elongated mounting portion of standard configuration adapted to be mounted to a conventional windshield wiper blade holding frame;
  (b) an elongated base portion of generally rectangular cross-section being integrally connected to said mounting portion and having a relatively flat surface on the opposite side thereof from said mounting portion;
  (c) an elongated relatively narrow transversely flexible connecting portion being integrally connected to said base portion and extending generally along the middle of said flat surface;
  (d) an elongated body portion of generally triangularly shaped cross-section having one apex thereof adapted to be generally pointed towards the windshield, said apex being disposed between first and second elongated faces of said body portion with a third elongated face of said body portion being integrally connected to said connecting portion and adapted to be disposed generally parallel to said flat surface on said base portion;
  (e) an elongated generally rectangular squeegee portion integrally connected to said body portion along said apex, said squeegee portion having an elongated free end surface generally parallel to said third face and generally parallel wiping surfaces extending therefrom toward said body portion, the intersection of said end surface and said wiping surfaces defining first and second wiping edges, said first wiping edge being adapted to wipe the windshield when said wiper blade is moved in one direction thereacross and said second wiping edge being adapted to wipe the windshield when said wiper is moved in the opposite direction, said first and second faces being generally concave in cross-sectional configuration; and
  (f) a scrubbing surface on each of said first and second faces comprising a plurality of short relatively stiff projections, said scrubbing surfaces do not engage the windshield when wiper blade is moved across the windshield in either direction and said squeegee portion does not encounter foreign matter on the windshield but which do individually engage the window to scrub foreign matter therefrom when said wiper blade is moved across the windshield in either direction and said squeegee portion encounters foreign matter on the windshield, the resultant increased friction between said squeegee portion and the windshield causing said squeegee portion in the area of said foreign matter to fold over further than normally to bring one of said scrubbing surfaces into action in the area of said foreign matter to remove same from the windshield.

51. An elastomeric windshield wiper blade as claimed in claim 50 wherein said scrubbing surface is formed separately from said wiper thereafter affixed thereto.

52. An elastomeric windshield wiper blade as claimed in claim 50 wherein said scrubbing surface is sufficiently open that it will not retain liquid found on the windshield.

53. An elastomeric windshield wiper blade as claimed in claim 50 wherein along the length of said wiper blade one portion thereof can be scrubbing at the same time another spaced portion thereof can be wiping only.

54. An elastomeric windshield wiper blade as claimed in claim 50 wherein said scrubbing surface comprises "Velcro"-type hook fastener material.

55. An elastomeric windshield wiper blade as claimed in claim 54 wherein said hook fastener material is a woven material.

56. An elastomeric windshield wiper blade as claimed in claim 55 wherein said hook fastener material is formed of nylon.

57. An elastomeric windshield wiper blade as claimed in claim 55 wherein said hook fastener material comprises a large number of upstanding loops which have been severed slightly below the bight portion thereof.

58. An elastomeric windshield wiper blade as claimed in claim 50 wherein transverse tilting of said body portion in operation causes it to engage said base portion to restrict the movement thereof.

* * * * *

UNITED STATES PATENT AND TRADEMARK OFFICE
CERTIFICATE OF CORRECTION

PATENT NO. : 5,048,146
DATED : September 17, 1991
INVENTOR(S) : Adrian Cavenago It is certified that error appears in the above-identified patent and that said Letters Patent is hereby corrected as shown below:

Column 4, line 9, "butressing" should be -- buttressing --.

Column 5, line 34, "end" should be -- and -- (second occurrence).

Column 7, line 66, "there across" should be -- thereacross --.

Column 8, line 2, "aid" should be -- said --.

Column 8, line 58, "wound" should be -- would --.

Column 10, line 35, "w!per" should be -- wiper --.

Signed and Sealed this

Sixteenth Day of March, 1993

*Attest:*

STEPHEN G. KUNIN

*Attesting Officer*  Acting Commissioner of Patents and Trademarks